A. E. WILSON.
CARRIAGE SUPPORT FOR AUTOMOBILE WHEELS.
APPLICATION FILED MAY 10, 1915.

1,184,291. Patented May 23, 1916.

WITNESSES:
F. C. Matheny
Horace Barnes

INVENTOR
Albert E. Wilson
BY
Pierre Barnes
ATTORNEY

UNITED STATES PATENT OFFICE.

ALBERT E. WILSON, OF SEATTLE, WASHINGTON, ASSIGNOR OF ONE-FOURTH TO WILLIAM H. HAWKES, OF MANETTE, WASHINGTON.

CARRIAGE-SUPPORT FOR AUTOMOBILE-WHEELS.

1,184,291.  Specification of Letters Patent.  Patented May 23, 1916.

Application filed May 10, 1915. Serial No. 27,143.

*To all whom it may concern:*

Be it known that I, ALBERT E. WILSON, a citizen of the United States, residing at Seattle, in the county of King and State of Washington, have invented certain new and useful Improvements in Carriage-Supports for Automobile-Wheels, of which the following is a specification.

This invention relates to improvements in devices for preventing rim cutting of pneumatic tires in cases where a motor vehicle is driven or otherwise propelled on a collapsed or flattened tire.

The object of the invention is to provide a small truck of light and substantial construction that may be placed under an automobile wheel having a collapsed tire to carry such wheel while the car is being driven or hauled to a place where the collapsed tire may be repaired or a new tire substituted.

The invention consists in the novel construction, adaptation and combination of parts, as will be more particularly described in the following specification, illustrated in the accompanying drawings and finally pointed out in the appended claims.

Figure 1:
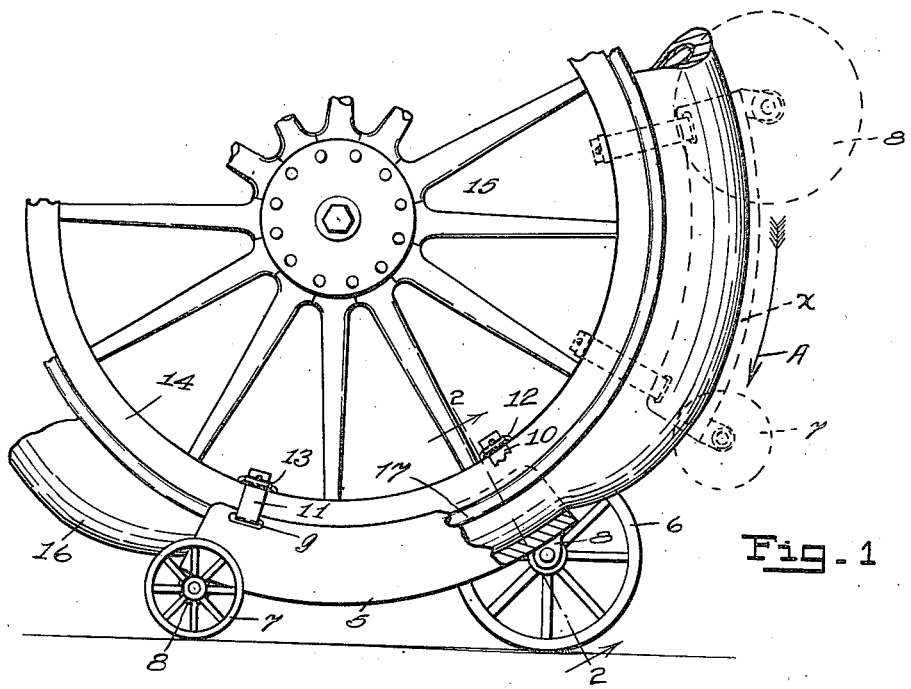
Figure 2:
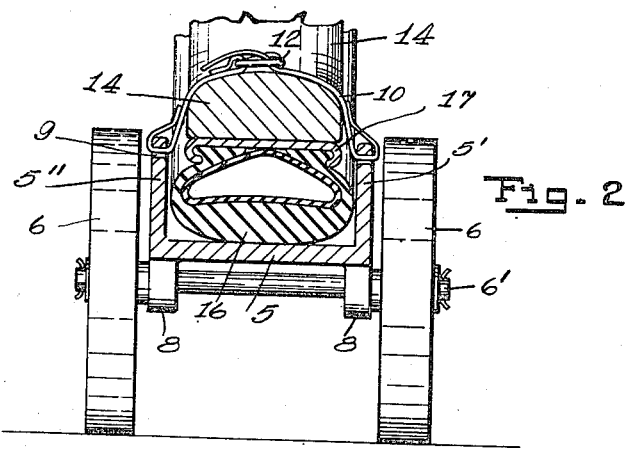

In the drawings, Figure 1 is a view in side elevation of a portion of an automobile wheel with my device applied thereto; and Fig. 2 is an enlarged view in cross section taken substantially on broken line 2—2 of Fig. 1.

Referring to the drawings in which like reference numerals indicate like parts, the reference numeral 5 designates a channel-shaped body member having upwardly projecting side flanges 5' and 5'' and curved longitudinally to conform to the arc or periphery of any desired size of automobile wheel.

6 and 7 indicate front and rear wheels, respectively, that are journaled on axles 6' and 7' which are supported in bearing boxes that depend from the under side of the body member 5, the front wheels 6 being desirably of larger diameter than the rear wheels 7. Said body is provided with side flanges 5', 5'' having near each end slots 9 in which are secured straps 10 and 11 for which are provided buckles 12 and 13 whereby such straps may be clasped around the felly 14 of an automobile wheel 15 to secure the truck thereto with a portion of a deflated tire 16 within the channel of the body.

When an automobile tire collapses on the road, as from a puncture or blow-out, and it is desired to drive or haul the automobile to a place where the tire may be repaired or a new tire substituted therefor, my device or truck may be buckled on the front of the automobile wheel and above the ground, as indicated by broken lines $x$ in Fig. 1, and with the larger truck wheels 6 in advance or above the other wheels 7. Being thus strapped to an automobile wheel, when the automobile is moved ahead this wheel 15 will be rotated in the direction indicated by arrow A in Fig. 1. When the rear truck wheels 7 encounter the road bed and by reason of their relatively small diameters allow the truck to be thrust under the wheel 15 until arrested by the larger truck wheels 6 contacting with the road-bed, the wheel 15 will cease to rotate and in any further progressive travel of the automobile the last named wheel will be carried upon the truck.

When the truck occupies the full-line position in Fig. 1, and bears the wheel 15, such weight of the automobile which is supported by the latter causes the tire 16 to become flattened on the truck body 5 and enable the wheel rim 17 to enter the space between the flanges 5', 5'', thus preventing a sidewise movement of wheel 15 with relation to the truck. The straps 10 and 11 may then, if desired, be tightened to better secure the truck to wheel 15.

My device may be secured to either a front or rear wheel of an automobile, and when used on the latter, the differential driving mechanism of the automobile will afford motion to the automobile rear wheel unprovided with my device while the complementary wheel 15 is ordinarily caused to be non-rotative through the offices of my device.

On approximately level road-beds the truck will serve to prevent the turning of the wheel, but when employed on roads having considerable grade or slope, it may be necessary to use supplementary means to accomplish such ends as, for example, by putting a chain about one of the wheel spokes and a side bar or other rigid object of the automobile frame.

What I claim, is—

1. A device of the class described, comprising a curved body member having side flanges that project upwardly to receive therebetween the tire of an automobile wheel, means for securing said body member to said automobile wheel, and wheels provided at the front and rear ends of said body member, respectively, said rear wheels being of relatively small diameters.

2. A truck of the class described, comprising a body member that is curved to fit the curvature of an automobile wheel, said body member having side flanges that are adapted to project upwardly on opposite sides of the tire of said automobile wheel, straps for securing said body member to said automobile wheel, and wheels provided on the front and rear ends of said body member, respectively, said front wheels being of large diameter and said rear wheels being of small diameter whereby, when said truck is secured to an automobile wheel and the latter is then moved forwardly, it will be lifted upon said truck to be carried thereby.

3. A truck of the class described, comprising a body member with a longitudinally arranged concave channel therein to fit its entire length against the periphery of a vehicle wheel, the sides of said channel terminating in flanges which project upwardly on opposite sides of the tire of said vehicle wheel, wheels provided for said member near the front and rear ends thereof, and flexible means connected to said flanges for securing the truck to the vehicle wheel at a distance above the supporting surface therefor and enable the truck to be revolved with the vehicle wheel when the latter is rotated and to carry the truck beneath the vehicle wheel.

Signed at Seattle, Washington, this 13th day of April, 1915.

ALBERT E. WILSON.

Witnesses:
PIERRE BARNES,
ALICE E. CALMUS.